Patented Apr. 10, 1928.

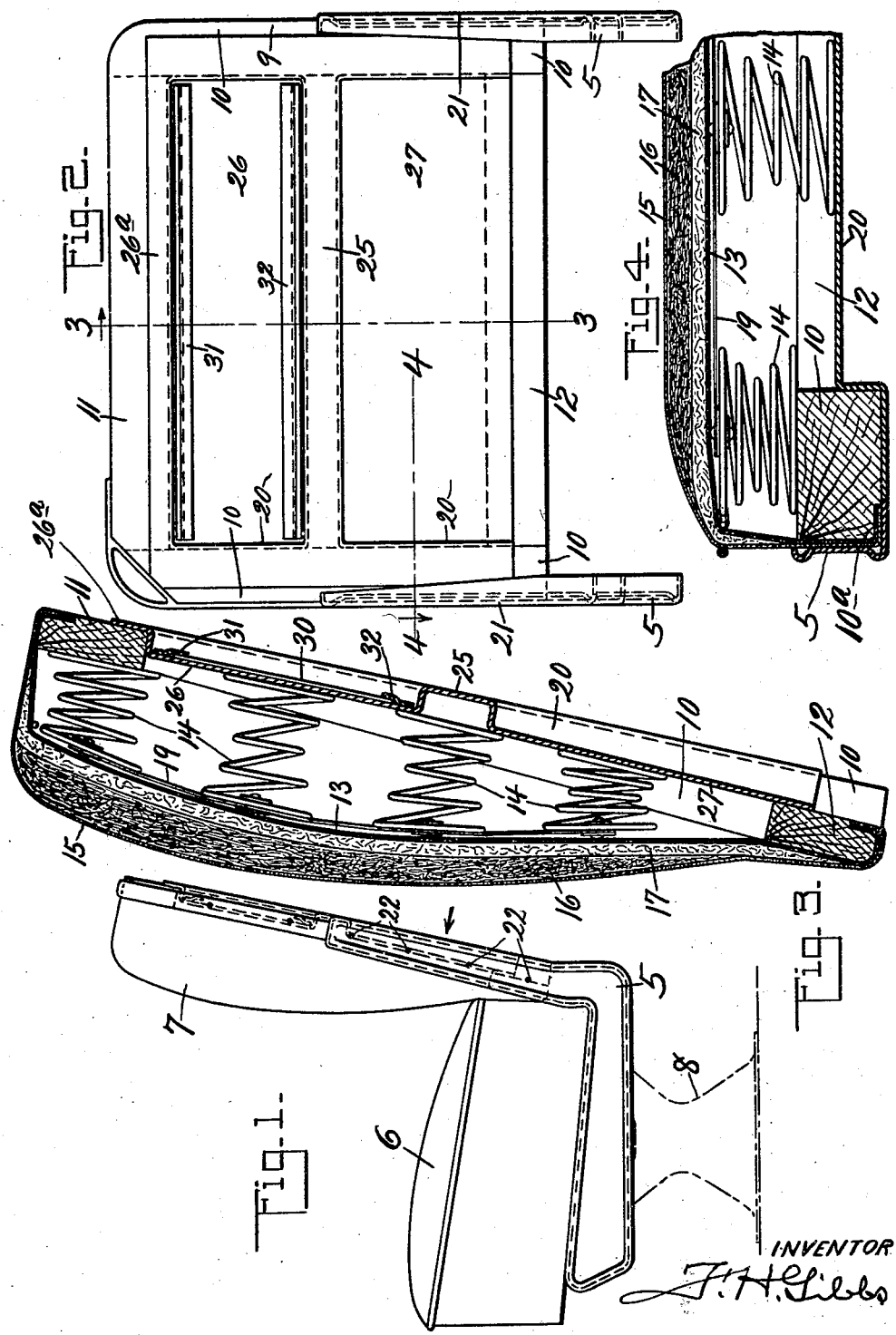

1,665,352

UNITED STATES PATENT OFFICE.

FREDERICK H. GIBBS, OF BROOKLYN, NEW YORK, ASSIGNOR TO AMERICAN CAR AND FOUNDRY COMPANY, OF NEW YORK, N. Y., A CORPORATION OF NEW JERSEY.

SEAT BACK.

Application filed September 17, 1926. Serial No. 136,092.

This invention relates to seat back construction, and is especially adapted and advantageous for motor bus seats and the like, where the space between seats is necessarily limited, and it is desirable to afford passengers as much room as possible with the closest possible seating. The invention also affords the advantage of a strong backing to sustain the springs of a spring cushion back.

The accompanying drawings illustrate the preferred form of the invention, though it is to be understood that the invention is not limited to the exact details of construction shown and described, as it is obvious that various modifications thereof within the scope of the claims will occur to persons skilled in the art.

In said drawings:

Fig. 1 is an end view of a motor bus seat embodying the present invention;

Fig. 2 is a rear view of the seat back with its supporting standards;

Fig. 3 shows a vertical section through the seat back, taken as indicated by the line 3—3 in Fig. 2;

Fig. 4 shows a fragmentary horizontal section through the seat back, taken as indicated by the line 4—4 in Fig. 2.

Fig. 1 shows an ordinary form of motor bus seat, including end frame structures 5, a cushioned seat 6, a cushioned back 7, and supporting structure indicated in dot and dash lines at 8.

The cushion back 7 comprises an outer frame 9 consisting of end members 10, 10 and top and bottom members 11, 12. The cushioning includes a first canvas or the like 13 over the helical springs 14, a cover 15 of any suitable material, and one or more interposed stuffing layers 16 and 17. The first canvas 13 and the cover 15 have their margins turned over around the outer edges of the cushion frame 9 and secured thereto in a rabbet 10$^a$ at the back. Adjacent the first canvas 13, the helical springs 14 are spaced apart and held in position by framing indicated at 19. The rear ends of the springs bear against and are sustained by the cushion frame 9 and by the back plate 20, presently to be described. The upward extending standards or arms 21 of the end structures 5 are of an angular section, so as to extend behind the frame ends 10 as well as to overlap their outer edges. As shown in Fig. 1, these standards 21 are secured to the outer edges of the frame ends 10 by screws 22.

In the present instance, the sheet metal back plate 20 which is preferably formed from a single sheet, covers and closes the rear of the cushion frame 9 in one piece. As will be seen from Figs. 2, 3 and 4, the margins of this backing 20 overlap the end and top frame members 10, 10 and 11, and may be secured to them in any suitable manner. The plate 20 is provided with a transversely extending corrugation forming a horizontal and preferably integral brace 25 extending from end to end of the frame 9, between the corresponding margins; this brace is here shown as of channel form with the channel web in the plane of the margins. Above and below the brace 25, the plate 20 is recessed or depressed panelwise substantially in conformity to the inner back frame outline, as indicated at 26 and 27. The recess 26 is in the form of an integral stiffening corrugation extending substantially across the seat and being bounded by the corrugation 25, the upper rail portion 26$^a$ and the end frame member cover-portion 20 of the back plate. The lower margin of the plate 20, it will be observed, forms a prolongation of the lower recessed panel 27, and overlaps the lower frame member 12,—which is set forward with reference to the plane of the rear surfaces of the frame ends 10, as shown in Fig. 3. This feature affords those in the seat behind full advantage of the increased space between seats due to the recession or depression of the lower panel 27: i. e., there is no projection of the bottom frame member 10 at the lower end of the panel 27 to diminish the effective space.

As shown in Figs. 2 and 3, provision may be made for mounting an advertising card 30 in the upper panel recess 26, as by means of upper and lower joggled strips 31, 32 secured to said panel adjacent its upper and lower edges. By entering and engaging the corresponding edges of the card 30 between and behind the outstanding edges of these retaining strips 31, 32, the card can be securely mounted so as to be easily removed or replaced.

What is claimed is:

1. A seat back comprising a frame and a sheet metal plate secured thereto, said plate having marginal flanges and an integral horizontal reinforcing brace extending from side to side of the frame and defining a recess above and below said brace, said recesses and said integral brace being positioned within the plane of the frame.

2. A seat back construction comprising in combination with angular seat back standards a seat back frame having a top member, end members engaging said standards and a bottom member set forward with reference to the rear surfaces of said end members, and a sheet metal back plate marginally overlapping the top member and the end members and having a continuous horizontal channel brace connecting the end members, said plate being recessed behind the plane of the margins above the brace and to the plane of the bottom frame member below the brace.

3. In a cushion seat, a frame having top, bottom and side members, a back comprising a plate having an angular upper end portion and angular side portions, said portions defining attaching flanges and bearing surfaces, the latter being adapted to seat against the inner sides of the top and side members whereby to position said plate within the plane of the frame, and a continuous reinforcing brace formed in said plate transversely thereof and extending between the side members.

4. In a cushion seat, a frame having top, bottom and side members, a back comprising a plate having an angular upper end portion and angular side portions, said portions defining attaching flanges and bearing surfaces, the latter being adapted to seat against the inner sides of the top and side members whereby to position said plate within the plane of the frame, and a continuous reinforcing brace formed in said plate transversely thereof and extending between the side members, with the web thereof within the plane of the frame.

5. In a cushion seat, a frame having side members, a top member and a bottom member set forward with respect to the top member and the rear edges of the side members: a back comprising a sheet metal plate having an offset attaching flange formed in its upper portion and both sides whereby to secure the plate to the frame within the plane of the side members, and an integral reinforcing channel brace formed in said plate transversely thereof and extending between the side members with its web within the plane of said frame side members.

In witness whereof I have hereunto set my hand.

FREDERICK H. GIBBS.